US005390904A

United States Patent [19]
Rivard et al.

[11] Patent Number: 5,390,904
[45] Date of Patent: Feb. 21, 1995

[54] ATTENUATED HINGE SPRING ASSEMBLY

[75] Inventors: Corey M. Rivard, Batavia; Eric G. Parker, Elgin; Robert K. Dutzi, Buffalo Grove, all of Ill.

[73] Assignee: Illinois Tool Works, Inc., Glenview, Ill.

[21] Appl. No.: 134,409

[22] Filed: Oct. 8, 1993

[51] Int. Cl.[6] .............................................. B60G 13/00

[52] U.S. Cl. ...................................... 267/204; 16/297; 16/289; 16/337; 267/275; 267/156

[58] Field of Search .................................... 267/25-27, 267/272, 273, 275, 154, 155, 156, 157, 204; 16/297, 289, 337; 160/191, 192; 49/386

[56] References Cited

U.S. PATENT DOCUMENTS

| | | | |
|---|---|---|---|
| 2,388,229 | 10/1945 | Light | 267/204 |
| 2,612,651 | 10/1952 | Roethel | 49/386 |
| 3,474,487 | 10/1969 | Resag et al. | 16/337 |
| 3,759,503 | 9/1973 | Moore | 267/275 |
| 4,483,426 | 11/1984 | Tagawa et al. | 267/156 |

*Primary Examiner*—Robert J. Oberleitner
*Assistant Examiner*—Lee W. Young
*Attorney, Agent, or Firm*—Trexler, Bushnell, Giangiorgi & Blackstone, Ltd.

[57] ABSTRACT

An attenuated hinge spring assembly for a trunk lid of an automotive vehicle includes a coiled spring which is connected to a bracket secured to the vehicle, a threaded stud which is secured to the bracket, a plate which is slidably mounted on the bracket and the stud, a nut rotatably attached to said threaded stud and selectively secured to an arm, and a washer which lies between the plate and the nut. The plate lies adjacent to the coiled spring. The arm is pivotally connected to the trunk lid and to the bracket. The spring is connected to the stud and the arm and uncoils as the arm pivots from a lowered position to a raised position to move the lid between a lowered position and a raised position. When the lid is raised, the arm rotates which causes the nut to rotate and translate along the stud, which in turn causes the washer and plate to translate along said stud. The plate moves against the coiled spring and frictionally brakes the spring and the nut to slow the momentum of the lid as the lid is being raised.

13 Claims, 2 Drawing Sheets

ATTENUATED HINGE SPRING ASSEMBLY

BACKGROUND OF THE INVENTION

This invention is generally directed to a hinge spring assembly for a lid, such, for example, as a trunk lid of an automotive vehicle for slowing the momentum of the lid as the lid pivots from a lowered position to a raised position.

Current trunks lids use a stop mechanism to stop the movement of the lid when the lid reaches the fully raised position. When a trunk lid is opened, a need to prevent the trunk lid from suddenly banging into the stop exists in order to prevent damage to the trunk lid or related hinge structure. This is especially important in the case of remotely actuated trunk opening devices since the operator is not there to slow the momentum of the trunk lid as it raises.

Some trunks include elongated gas springs or springs with little force that allow the trunk lid to be moved to a raised position. These types of assemblies require that the operator manually open the trunk to the raised position and cannot be used in a remotely actuated application.

The present invention is intended to overcome or minimize all of these problems, as well as to present several other improvements.

OBJECTS AND SUMMARY OF THE INVENTION

A general object of the present invention is to provide a spring hinge assembly for a lid or closure member, which assembly may be particularly useful for an automotive vehicle for controlling the movement and momentum of a trunk lid as the lid moves from a lowered position to a raised position.

Another object of the present invention is to provide a hinge spring assembly that may be used in an operator actuated opening of a lid or a remotely actuated opening of the trunk lid and constructed for controlling rate of movement of the lid.

It is a further object of the present invention to provide a hinge spring assembly that includes a coiled spring which is frictionally braked by an attenuator plate which is moved against the spring by action of a nut for controlling movement of the lid.

A more specific object of the present invention is to provide a novel spring-actuated assembly for a lid constructed for progressively varying the spring force delivered to the lid in accordance with movement of the lid between a closed position and an open position.

Still another object of the present invention is to provide a novel spring assembly of the above-described type capable of slowing movement and decreasing momentum of a lid moving from a closed position toward an open position.

While the spring assembly of the present invention may be used with a wide variety of lids or closures in different environments, it will, for convenience, be described herein for use in controlling operation of a vehicle trunk lid.

Briefly, one embodiment comprises a bracket secured to the vehicle. An arm is mounted for pivotal movement relative to the bracket and is pivotally interconnected to a trunk lid for movement with the lid between a lowered position and a raised position. The hinge spring assembly includes a coiled spring which is connected to the bracket and the arm, a threaded stud which is secured to the bracket, a plate which is slidably mounted on the bracket, a nut which is rotatably engaged on the stud and a washer which lies between the plate and the nut. The spring is connected to the arm and uncoils when the arm is pivoted from a lowered position to a raised position as the lid is raised. The plate lies adjacent to the coiled spring and is adapted to translate along the stud when the lid is raised. When the arm is pivoted between a lowered position and a raised position as the lid is moved between a lowered position and a raised position, the rotation of the arm causes the threaded nut to rotate on the threaded portion of the stud. Since the stud is fixed relative to the bracket, the rotating nut translates along the threaded stud which causes the washer to translate, which, in turn, causes the plate to translate and move against the spring. When the plate progressively abuts the spring with increasing force, a frictional progressive braking action is achieved which slows rotation of the arm and also attenuates the force output of the spring, thereby controlling and reducing the momentum and rate of movement of the lid.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 2:
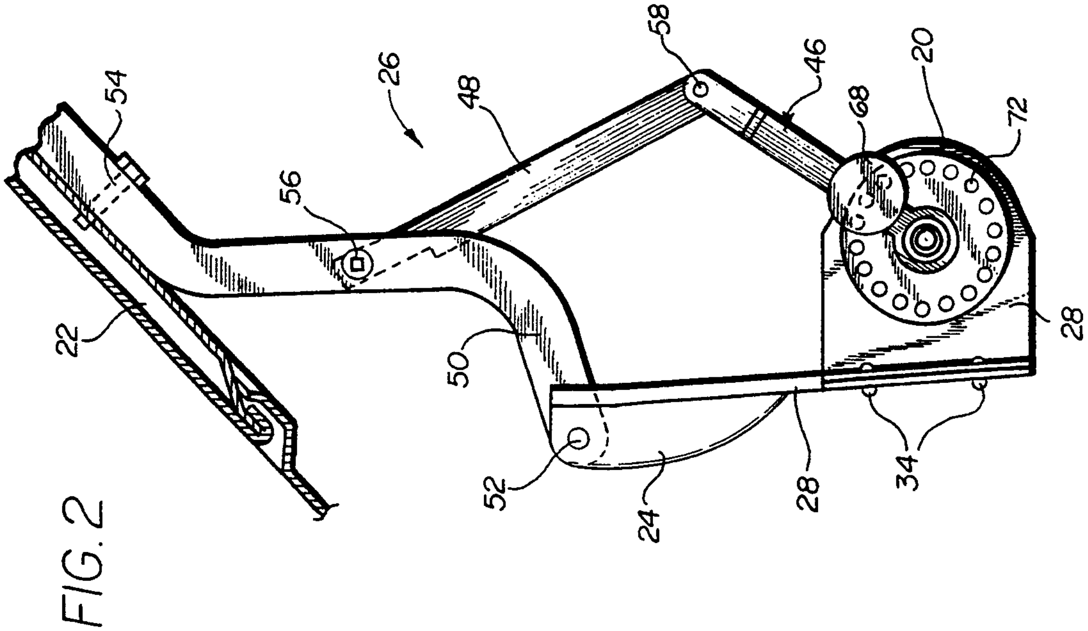
FIG. 2 is a view similar to FIG. 1, with the trunk lid in a raised position.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

In the drawings, a hinge spring assembly 20 for a trunk lid 22 of an automotive vehicle is disclosed. As the trunk lid 22 is raised, the center of gravity of the lid 22 moves backward toward the vehicle body 24 and the momentum of the lid 22 increases. In order to prevent damage to the structure, the novel hinge spring assembly 20 of the present invention slows the momentum of the trunk lid 22 as the lid 22 moves or pivots from a lowered position to a raised position. The hinge spring assembly 20 attenuates the force of the spring and the movement of the trunk lid 22 during approximately, for example, the last 10° of movement as the lid 22 is raised to its final position. This prevents the lid 22 from suddenly banging into a trunk lid stop (not shown).

Figure 1:
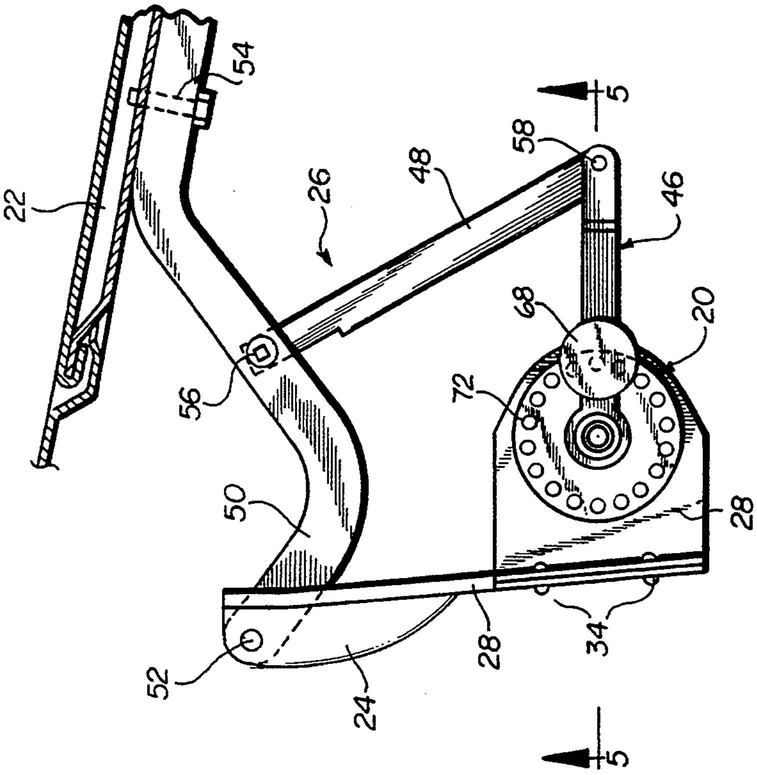
FIG. 1 is a side elevational view of a hinge spring assembly according to the present invention interconnected by an arm assembly to a trunk lid in a lowered position of an automotive vehicle.
Figure 3:
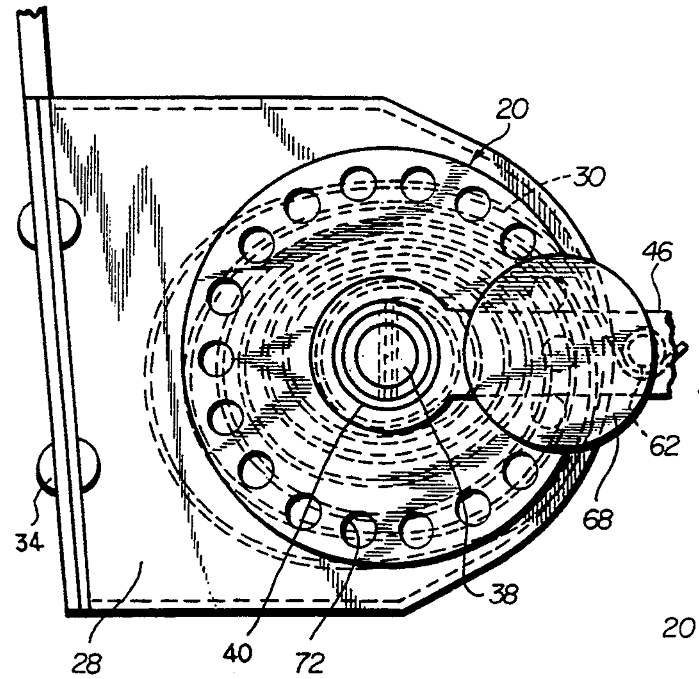
FIG. 3 is a side elevational view of the hinge spring assembly, with a spring shown in phantom in a fully coiled configuration according to the present invention, and a partial view of the arm assembly.
Figure 5:
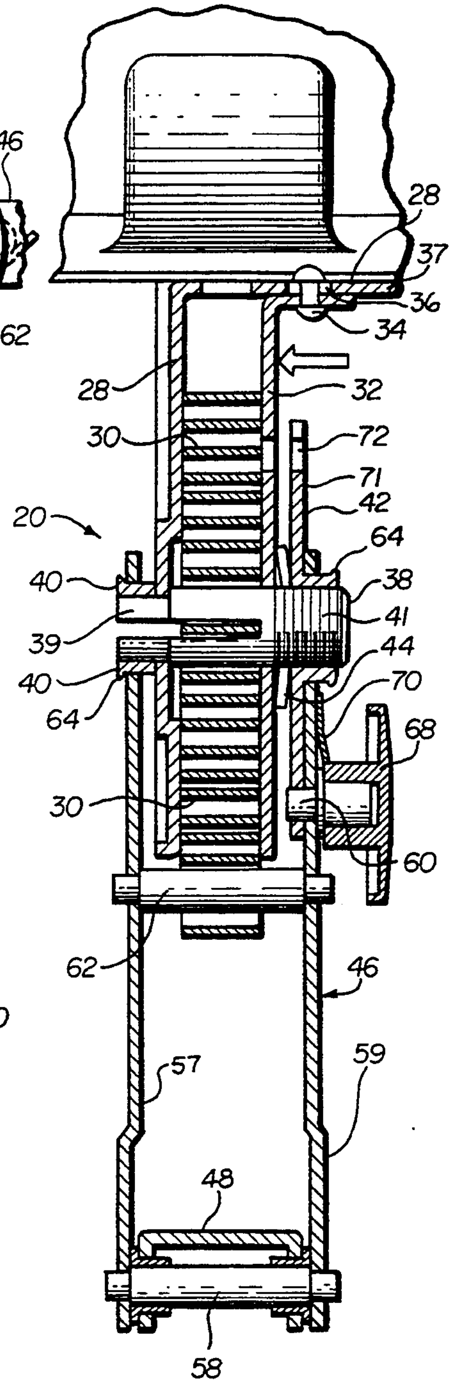
FIG. 5 is a cross-sectional view of the hinge spring assembly along line 5—5 in FIG. 1.
Figure 4:
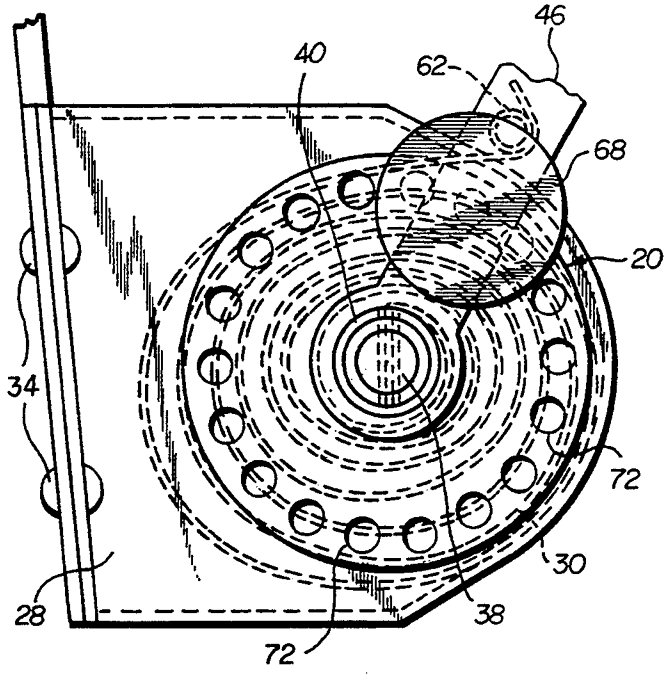
FIG. 4 is a view similar to FIG. 3, with the coiled spring shown in a partially uncoiled configuration.

An arm assembly 26 and the novel hinge spring assembly 20 of the present invention are used to move the trunk lid 22 from a lowered position, as shown in FIG. 1, to a raised position, as shown in FIG. 2. As shown in FIGS. 3–5, the spring hinge assembly 20 is mounted on a stationary bracket 28 which is connected to the vehicle body 24 by suitable means. The spring hinge assembly 20 generally includes a clock-like, coiled spring 30 which is connected to and abuts the bracket 28. An attenuator plate 32 is adjacent to the coiled spring 30 and is slidably connected to the bracket 28 at one end thereof. The plate 32 has rivets 34 connected thereto which extend through slots 36 in an end flange 37 of the bracket 28 in order to allow the plate 32 to move relative to the bracket 28.

The spring hinge assembly 20 also includes a partially threaded stud 38 which has an end portion 39 that is fixedly secured to the bracket 28 by a spacer 40 and suitable welds. An opposite end portion 41 of the stud 38 is threaded and an internally threaded adjustor nut 42 is connected to and encircles the threaded portion 41 of the stud 38. The adjustor nut 42 lies adjacent to the attenuator plate 32. A washer 44, preferably a Belleville or other spring washer, lies between the plate 32 and the adjustor nut 42.

The coiled spring 30 used in the present invention may be a torsion spring. An end portion of the coiled spring 30 is connected to the partially threaded stud 38. The other end portion of the spring 30 is connected to a crank arm member 46 as described hereinbelow.

As illustrated in FIGS. 1 and 2, the arm assembly 26 includes a crank arm member 46 which is pivotally and operatively inter-connected to the trunk lid 22 by a link arm member 48 and a goose neck or trunk connecting arm member 50. The trunk connecting arm member 50 has one end connected to the vehicle 24 by a suitable pin 52 and the other end connected to the underside of the trunk lid by appropriate means, such as a screw 54. The link arm member 48 has one end connected to the trunk connecting arm member 50 by a pin 56 and the other end connected to an end of the crank arm member 46 by a suitable pin 58 and bushing.

In the embodiment shown, the crank arm member 46 comprises parallel links 57 and 59, respectively, having end portions secured to the outside of the adjustor nut 42 at one end of the stud 38 and to the spacer 40 on the other end of the stud 38. The crank arm member 46 is secured to the nut 42 by an adjustor pin 60. The position of the crank arm member 46 may be selectively adjusted relative to the nut 42, as described herein. The end of the coiled spring 30 is secured to the crank arm member 46 by a hook pin 62 which is mounted along the length of the crank arm member 46 between the links 57 and 59.

The above description of the specifics of the novel spring hinge assembly 20 and the arm assembly 26 is best understood by a description of the mechanics of the assemblies during the raising of the trunk lid 22 as described hereinbelow.

When the trunk lid 22 is in a lowered, closed position, the arm assembly 26 is in a first or retracted position, as shown in FIG. 1, and the nut 64 is loosened so that the plate 32 is effectively disengaged from the spring 30. In the closed position, the center of gravity of the lid is offset a maximum amount from its pivot pin 52, so that a maximum force is required to start lifting the lid. The spring 30 is selected to provide this maximum force for lifting the lid. It is to be understood that, if desired, a pair of the spring assemblies could be provided respectively located at opposite sides of the lid. In any event, total spring force should be sufficient to raise the lid. As the lid 22 is moved from the lowered position to a raised position, the trunk connecting arm member 50 rotates upwardly about the pin 52 connected to the vehicle 24. This causes the link arm member 48 to rotate, which, in turn, causes the crank arm member 46 to rotate, as shown in FIG. 2. At the same time, the center of gravity of the lid shifts with respect to the pivot 52, so that as the lid approaches its raised position, progressively less force is required to continue the lifting operation.

When the crank arm member 46 rotates due to the lid 22 moving from lowered position to a raised position, the coiled spring 30 uncoils, as shown in FIG. 4, and the crank arm member 46 causes the adjustor nut 42 to rotate around the partially threaded stud 38 since the crank arm member 46 is secured to the adjustor nut 42 by the adjustor pin 60. Since the stud 38 is threaded and fixed against rotation, the crank arm member 46 and nut 42 translate along the length of the stud 38. The other side of the crank arm member 46 rotates and translates along the length of the spacer 40.

As the nut 42 translates, it contacts the spring washer 44 causing the washer 44 to compress and to translate along the length of the stud 38. The distance the nut translates for a given degree of rotation depends on the pitch of the threads. Different pitches may be used, and by way of example only, the study may have a diameter of $\frac{3}{8}$ inch with 18 threads per inch. As the washer 44 translates, the washer 44 contacts the attenuator plate 32 and causes the plate 32 to translate along the length of the stud 38. By selecting the desired spring rate of the washer, the force with which the plate 32 is clamped against the spring 30 may be modified as the nut advances along the threaded portion of the stud. In other words, the spring washer provides a function similar to what would be achieved by changing the pitch of the threads on the stud. The plate 32 is able to move relative to the bracket 28, since the rivets 34 allow the plate 32 to slide along the length of the slots 36 on the plate 32.

As the plate 32 translates, it moves against the uncoiling spring 30 and frictionally engages the spring 30 and the nut 42. The frictional engagement of the spring as it is clamped between the plate 32 and the bracket 28 resists rotation of the spring for creating a braking action. At the same time, the spring force tending to uncoil the spring and, thus, drive the lid upwardly is attenuated or reduced progressively so that there is less force tending to drive the lid approaching its raised position during the portion of the lid movement which requires less force because of the changing location of the center of gravity. As a result, the attenuated spring hinge assembly of the present invention functions effectively to raise the lid and also to slow and reduce the momentum of the lid as the lid approaches its raised position. It is also noted that when it is desired to close the lid, there will be a minimum of spring force resisting starting of the closing operation.

An additional feature of note is that the spacer 40 and adjustor nut 42 includes stops 64 at the outside ends thereof. These stops 62 prevent the crank arm member 46 from sliding or rotating off of the spring hinge assembly 20.

Another feature of the present invention is an adjusting assembly 66 which allows an operator to select the initial position where the arm assembly 26 is connected to the hinge spring assembly 20 to selectively adjust the attenuation action of the plate 32. The adjusting assembly 66 includes the adjustor pin 60 and an adjustor knob 68 which is attached to the crank arm member 46 by an adjustor spring or leaf spring 70. As shown in the drawings, the adjustor nut 42 includes a disc portion 71 having a plurality of spaced apertures 72 around its circumference. The adjustor pin 60 is held in one of the apertures 72 therein to connect and secure the crank arm member 46 to the adjustor nut 42. The adjustor knob 68 covers the pin 60 to prevent the pin 60 from sliding out of the aperture 72.

In order to adjust the initial position of the crank arm member 46 relative to the adjustor nut 42, the adjustor knob 68 and pin 60 are removed. When the adjustor nut 42 is held stationary by suitable means, such as inserting a screwdriver into one of the apertures 72 to hold the nut 42 stationary, this allows the crank arm member 46 to be freely rotated by an operator relative to the adjustor nut 42. When the crank arm member 46 is moved to the desired position, the pin 60 and knob 68 are replaced. By moving the initial position of the crank arm member 46, the engagement of the attenuation plate 32 is selectively adjusted and the braking action will begin at a greater or lesser degree depending on the new position.

The novel spring hinge assembly 20 can include suitable circuitry for enabling an operator to remotely actuate the trunk lid 22. Since the momentum of the lid 22 is slowed by the engagement of the spring hinge assembly 20, the operator does not need to manually open the trunk lid 22.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A hinge spring assembly for a lid, comprising:

a bracket mountable in a fixed position adjacent to a lid;

a coiled spring having coils connected to said bracket;

an arm member having a first end portion operatively interconnectable with said lid, and a second end portion operatively inter-connected with said coiled spring for movement of said arm member between a first position and a second position for moving the lid between a closed position and an open position, said coiled spring uncoiling when said arm member is moved between the first position and the second position; and frictional braking .means for frictionally restraining movement of said coiled spring, said frictional braking means directly engaging a plurality of the coils of the coiled spring when said arm member is moved toward said second position to slow the momentum of the lid as the lid moves to said open position.

2. A hinge spring assembly, as defined in claim 1, wherein said frictional braking means comprises:

a threaded stud fixedly secured to said bracket;

an end portion of said coiled spring being attached to said threaded stud;

a plate slidably mounted for movement relative to said bracket, said plate lying adjacent said coiled spring, said plate being operatively inter-connected to said arm member, said plate moving against said coiled spring when said arm member is moved between the first position and the second position.

3. A hinge spring assembly, as defined in claim 2, wherein said frictional braking means further includes a nut rotatably attached to said threaded stud and selectively secured to said arm member, said nut lying adjacent said plate, said nut rotating about and translating along said threaded stud to move said plate against said coiled spring to frictionally brake said coiled spring and said nut when said arm member is moved between the first position and the second position.

4. A hinge spring assembly, as defined in claim 3, wherein said frictional braking means further includes a spring washer lying between said plate and said nut, said spring washer being mounted for translation along said threaded stud to move said plate against said coiled spring when said nut translates to frictionally brake said coiled spring.

5. A hinge spring assembly, as defined in claim 3, further comprising an adjusting means connected to said arm member and said nut for adjusting the position of said arm member relative to said nut.

6. A hinge spring assembly, as defined in claim 3, wherein said adjusting means comprises a pin connecting said arm member to said nut, said pin being removable for adjusting said arm member relative to said nut.

7. A hinge spring assembly, as defined in claim 6, wherein said nut further includes a plurality of circumferentially spaced apertures for selectively accepting said pin therein.

8. A hinge spring assembly, as defined in claim 1, for a trunk lid of a vehicle, further comprising:

a trunk lid connecting arm member having a first end portion pivotally mounted on said vehicle and a second end portion secured to the underside of the trunk lid, said first-defined arm member pivotally connected to said trunk lid connecting member for movement with said lid between a lowered position and a raised position as said trunk lid connecting arm member and said first-defined arm member pivot between a lowered position and raised position.

9. A hinge spring assembly as defined in claim 8, further including a link member pivotally connecting said first-defined arm member to said trunk lid connecting arm member.

10. A hinge spring assembly for a trunk lid of an automotive vehicle, comprising:

a bracket adapted to be secured to said vehicle;

a coiled spring connected to said bracket, said coiled spring having end portions;

an arm member having a first end portion pivotally interconnected to said trunk lid and a second end portion pivotally inter-connected to said bracket for movement of said arm member between a lowered position and a raised position for pivoting said lid between a lowered position and a raised position; said coiled spring having an end portion connected to said arm member for uncoiling said spring when said arm member is pivoted between said lowered position and said raised position;

a threaded stud pivotally connecting said arm member to said bracket, an end portion of said coiled spring being attached to said threaded stud;

a plate slidably mounted on said bracket and said stud, said plate lying adjacent said coiled spring;

a nut rotatably attached to said threaded stud, said stud being fixed against rotation with respect to the bracket, said nut being fixed against rotation with respect to said arm member, said nut and stud biasing said plate against said spring when the arm member is moved between lowered position and said raised position; and a spring washer on said stud between said plate and said nut for yieldably biasing the plate member against the spring as the arm member pivots between said lowered position and said raised position.

11. An attenuated hinge spring assembly for controlling opening of a lid, comprising:

a spring having coils adapted to be anchored adjacent a lid to be controlled;

an arm member interconnected with said spring and adapted to be interconnected with the lid for moving the arm member between a first position and a second position for moving the lid by force from the spring between a closed position and an open position; and an engaging member responsive to movement of said arm member from said first position toward said second position for directly engaging a plurality of the coils of said spring and attenuating the spring force as the an member moves toward the second position.

12. An assembly as defined in claim 11, which includes:

a threaded stud element and a threaded nut element on the stud element, one of said elements being fixed against rotating relative to said spring and the other of said elements being fixed relative to said arm member, said elements being relatively axially translated upon movement of said arm member toward said second position for clamping said engaging member against said spring.

13. An assembly as defined in claim 12, which includes a spring washer on said stud for yieldably clamping the engaging member against said spring.

* * * * *

UNITED STATES PATENT AND TRADEMARK OFFICE

CERTIFICATE OF CORRECTION

PATENT NO. : 5,390,904

DATED : February 21, 1995

INVENTOR(S) : Corey M. Rivard, Eric G. Parker and Robert K. Dutzi

It is certified that error appears in the above-indentified patent and that said Letters Patent is hereby corrected as shown below:

Column 8, Line 5 " the an member" should be -- the arm member--

Signed and Sealed this

Twentieth Day of June, 1995

Attest:

BRUCE LEHMAN

*Attesting Officer*

*Commissioner of Patents and Trademarks*